United States Patent [19]
Marsh et al.

[11] 3,891,737
[45] June 24, 1975

[54] METHOD OF MAKING A HEAT SHRINKABLE FILM OF POLYETHYLENE COPOLYMERS THEREOF AND ARTICLE PRODUCED THEREFROM

[75] Inventors: Alexander J. Marsh, Republic; Henry O. Sargent, Harrisonburg, both of Va.

[73] Assignee: Reynolds Metals Company, Richmond, Va.

[22] Filed: Nov. 21, 1973

[21] Appl. No.: 419,164

[52] U.S. Cl. ............... 264/95; 264/210 R; 264/230; 264/288; 264/291; 264/342 R
[51] Int. Cl. ... B29c 17/02; B29c 17/07; B29c 25/00
[58] Field of Search ............ 264/95, 230, 288, 291, 264/342 R, 210 R

[56] References Cited
UNITED STATES PATENTS

| | | | |
|---|---|---|---|
| 3,551,540 | 12/1970 | Pellicciari et al. | 264/230 |
| 3,659,000 | 4/1972 | Cronk | 264/291 |

*Primary Examiner*—Jeffery R. Thurlow
*Attorney, Agent, or Firm*—Glenn, Palmer, Lyne & Gibbs

[57] ABSTRACT

A method of making a preferentially oriented heat shrinkable film of polyethylene or polyethylene-containing copolymers thereof and an article produced therefrom. The heat shrinkable film produced has a shrink characteristic which is generally controlled by the quantum of heat applied thereto. In contradistinction with known films, the film does not have to be heated above its melting point to possess a useful amount of shrink. Improved properties are obtained for the film by narrowly restricting the stretch ratio between 1.2:1 and 1.3:1.

1 Claim, 1 Drawing Figure

PATENTED JUN 24 1975　　　　　　　　　3,891,737
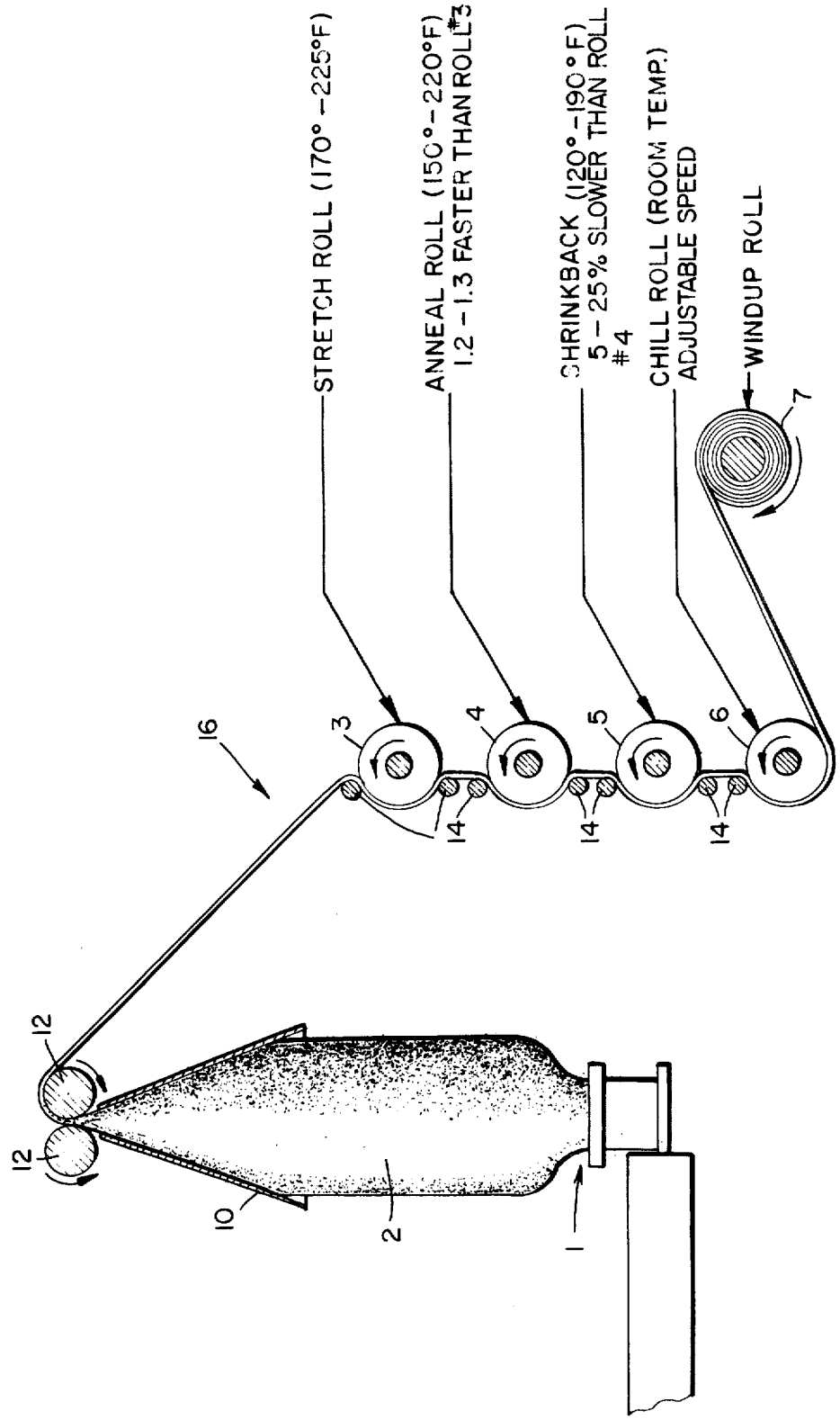

METHOD OF MAKING A HEAT SHRINKABLE FILM OF POLYETHYLENE COPOLYMERS THEREOF AND ARTICLE PRODUCED THEREFROM

This invention relates to a method of making a preferentially oriented heat shrinkable film and an article produced therefrom and, more particularly, to such a method which produces a heat shrinkable film having a shrink characteristic which is generally controlled by the quantum of heat applied thereto.

Heretofore it has been known to produce heat shrinkable films which, with the exception of biaxial shrink films, do not exhibit a usable amount of shrink until the temperature of the applied heat exceeds the melting point of the polymer and the heat source is then removed in order to permit the film to shrink. This is known in the trade as "contractive shrink".

In accordance with the present invention, a unique film is produced which is oriented in a single direction and which shrinks in a controlled manner as the temperature of applied heat is increased. The film produced by the present invention is more economical than a biaxial shrink film since it is made in a one step process.

Another important aspect of the present invention is the discovery of the relative criticality of the stretch ratio or stretch factor in order to preserve desirable properties of the film. These properties include the heat seal temperature range, the strength of seals made by hot wire or the like, the usable shrink tunnel temperature range, and the prevention of lap wrinkles in a shrink wrapped packaage.

It has been found in the development of the present invention that the heat seal temperature range is narrowed if the stretch ratio or stretch factor exceeds about 1.3:1. It has also been found that the strength of hot wire seals diminishes if the stretch ratio or stretch factor exceeds about 1.3:1. The usable shrink tunnel temperature range narrows if the stretch ratio or stretch factor exceeds about 1.3:1. On the other hand, lap wrinkles become very noticeable if the stretch ratio or stretch factor is less than about 1.2:1. A lap wrinkle is a condition in which the film folds and fuses on itself. Accordingly, it is preferred to employ a stretch ratio or stretch factor between about 1.2:1 and 1.3:1 with a preferred ratio or factor of about 1.25:1.

The general arrangement of the present invention is to extrude the film in tubular form. U.S. Pat. No. 3,752,637 (Hinrichs) issued on Aug. 14, 1973 and assigned to a common assignee of the present invention illustrates a die apparatus for making extruded and blown tubular film. It has been found convenient to use a roll stand having vertically arranged rolls thereon which are driven at predetermined speeds from a gear box with the temperature of the individual rolls being controlled separately by external heat exchangers and by the use of hot oil inside the rolls themselves. The article of manufacture of the present invention is made in a one step process as the film is directly wound up on a winding roll which may be provided with a suitable core material.

In the practice of the method of the present invention, the following steps may be practiced:

1. extruding a heat shrinkable film in tubular form;
2. conveying the film over a series of heated rolls to effect stretching, annealing, and shrinking back of the film;
3. employing a stretch ratio or factor between about 1.2:1 and 1.3:1;
4. cooling the film;
5. winding up the film on a wind-up roll;
6. maintaining the roll used to effect stretching at a temperature from about 170°F. to about 225°F.;
7. maintaining the roll used to effect annealing at a temperature from about 150°F. to about 220°F.;
8. maintaining the roll used to effect shrink back at a temperature from about 120°F. to about 190°F.;
9. driving the roll used to effect shrinking back at a speed of from about 5% to about 25% slower than the roll which effects annealing.

At the present time the invention has been practiced on tubular polyethylene and polyethylene copolymers containing fixed amounts by weight, of ethylene vinyl acetate. The invention is believed to be particularly well suited to these films.

The inherent advantages and improvements of the present invention will become more readily apparent upon considering the following detailed description of the invention and by reference to the drawing in which:

The sole FIGURE of the drawing is a front elevational view, schematic in nature, and taken partially in vertical cross section to illustrate the practice of the present invention.

Referring now to the drawing, an extrusion die is schematically illustrated at 1. This die may be of the type shown and described in the aforementioned Hinrichs Pat. No. 3,752,635 wherein a plastic bubble emerges at the outlet of the die and is inflated and ventilated by continuously circulating gases with the temperature of the gases being controlled as they enter and leave the bubble so that it does not adversely effect the temperature of the melt in the die. Reference to this point may be had for the details of construction. The polyethylene film 2 which emerges therefrom is controlled by suitable guide means 10 toward a pair of nip rolls 12 which may be driven at variable speeds.

Thereafter, the film is directed or conveyed toward a roll stand indicated generally at 16 wherein a plurality of guide rolls 14 entrain the plastic film about a series of rolls consisting of a stretch roll 3, an anneal roll 4, a shrink back roll 5 and a chill roll 6. From there the plastic film is directed to a wind-up roll 7 which provides a suitable core for the plastic film. For purposes of this invention, the core upon which the film is wrapped is deemed to be completely standard and conventional in the art.

Reverting now to the roll stand 16, the rolls 3–6 thereof are driven from a suitable gear box arrangement, not shown, whereby the speeds thereof may be controlled vis-a-vis the speed of the nip rolls 12. It is desired that the plastic film be stretched in its longitudinal direction which is to become the direction through which the film is to be run through a heat seal packaging machine and therefore this longitudinal direction is also designated its machine direction. The direction at right angles thereto is known as the cross direction. In particular, by controlling the speed of rolls 3 and 4, a stretch ratio or factor is effected which is noted by the legend on the drawing is carefully controlled by having the anneal roll driven by a factor of from 1.2 to 1.3 faster than the stretch roll 3.

The shrink back roll 5 is driven at a speed of from 5 to 25% slower than anneal roll 4 whereas chill roll 6 is driven at a variable speed while observing the film and controlling the speed to prevent the development of wrinkles in the film. Although the roll stand usually has a read-out device to tell the linear speed of the rolls, this read-out device frequently becomes inaccurate and it is preferred to utilize handheld tachometers in order to control the stretch ratios accurately.

As designated on the drawing, the stretch roll is maintained at from about 170°F. to about 225°F., the anneal roll is maintained at a temperature of about 150°F. to about 220°F., the shrink back roll is maintained at a temperature from about 120°F. to about 190°F. and the chill roll is at room temperature.

EXAMPLE 1

The practice of the invention will be illustrated by the following table for typical roll stand conditions:

| | |
|---|---|
| Stretch Roll Temperature: (°F.) | 215 |
| Anneal Roll Temperature: (°F.) | 192 |
| Shrink Back Roll Temperature (°F.) | 180 |
| Nip Roll Speed, R.P.M. | 105 |
| Stretch Roll Speed, R.P.M. | 97 |
| Anneal Roll Speed, R.P.M. | 121 |
| Chill Roll Speed, R.P.M. | 110 |
| Stretch Ratio | 1.25:1 |
| Shrink Back, Percent | 10 |
| Input Width of Film (Inches) | 29 |
| Input/Output Gauge (Mils) | 1.35/1.1 |
| Heat Seal Temperature (Multibar) | 230–265°F. |
| Shrink Temperature Range (°F.) | 260–310°F. |

A Great Lakes Shrink Tunnel Model 9W was used in connection with the readings obtained above with a retention time in the shrink tunnel of 5.7 seconds. The resin used in the foregoing example was supplied by Eastman Chemical Company designated Resin Tenite 1810-F. This is a low density polyethylene homopolymer having a density of 0.923 and a melt index (melt flow) of 0.7.

EXAMPLE 2

Using the same film as in Example 1, the effect of varying the stretch ratio on the shrink temperature range and heat seal temperature range is illustrated in the following table:

| STRETCH RATIO | SHRINK RANGE °F. | SEAL (MULTIBAR) (°F.) |
|---|---|---|
| 1.13 | 260–325 | 230–290 |
| 1.17 | 260–325 | 230–290 |
| 1.24 | 260–325 | 230–275 |
| 1.39 | 260–310 | 230–270 |
| 1.55 | 260–305 | 230–265 |
| 1.61 | 260–300 | 230–240 |
| 1.77 | 255–295 | 230–240 |

Testing of the foregoing film after extrusion but prior to passage through the roll stand revealed that this film had a shrink range of 255°–315°F. and a seal range of 220°–310°F.

Numerous tests such as illustrated above in Example 2 tend to show that as the stretch ratio exceeded about 1.30:1 that the heat seal temperature range began to diminish as did the shrink temperature range.

In order to shrink wrap packages, it is generally desirable to have a film which exhibits a shrink force of less than 200 pounds per square inch so that the package will not be crushed or unduly distorted by the shrinkage film. Tests were conducted on a number of films produced from different resins including SK2000-F resin supplied by the Sinclair-Koppers Company. This resin is a low density homopolymer whose density is 0.923 and whose melt index (melt flow) is 0.25. In heating the film produced from this resin it was observed that a shrink force was exhibited beginning at about 207°F. and rising to 30 pounds per square inch at about 240°F. Upon cooling, contractive stress then starts at 210°F., and rises to 120 pounds per square inch at room temperature. Using Tenite 1810-F, the resin used in connection with Examples 1 and 2, a film was produced having a shrink force which upon heating starts at 190°F. and rises to 22.5 pounds per square inch at 220°F. Upon cooling contractive stress then starts at 215°F. and rises to a value of 112.5 pounds per square inch at room temperature.

EXAMPLE 3

In order to illustrate that the shrink characteristic is generally controlled by the quantum of heat applied thereto shrinkage measurements (in percentage of shrink) were made in a shrink analyzer device at different temperatures as follows:

| USING TENITE 1810F | | | | | | | | | | | |
|---|---|---|---|---|---|---|---|---|---|---|---|
| % SHRINK | 150 | 175 | 200 | 205 | 210 | 220 | 230 | 240 | 250 | 260 | 270 | 280 |
| BRS-MD | 0 | 0 | 0 | 0 | 0 | 0 | 0 | 15 | 28 | 37 | 37 | 39 |
| BRS-CD | 0 | 0 | 0 | 0 | 0 | 0 | 0 | 0 | 5 | 9 | NR | NR |
| ARS-MD | 0 | 0 | 0 | 0 | 0 | 2 | 5 | 25 | 33 | 40 | 44 | 46 |
| ARS-CD | 0 | 0 | 0 | 0 | 0 | 0 | 0 | 0 | 1 | 3 | 3 | 3 |

| USING SK2000F TEMPERATURE °F. | | | | | | | | | | | |
|---|---|---|---|---|---|---|---|---|---|---|---|
| % SHRINK | 150 | 175 | 200 | 205 | 210 | 220 | 230 | 240 | 250 | 260 | 270 | 280 |
| BRS-MD | 0 | 0 | 0 | 0 | 0 | 0 | .5 | 18 | 30 | 41 | 43 | 44 |
| BRS-CD | 0 | 0 | .5 | .5 | .5 | 1 | 5 | 15 | 25 | 26 | NR | NR |
| ARS-MD | 0 | 0 | 0 | 0 | 1 | 5 | 16 | 40 | 47 | 50 | 53 | NR |
| ARS-CD | 0 | 0 | 0 | 0 | 0 | 0 | 0 | 8 | 11 | NR | NR | NR |

BRS-MD in the above table indicates readings taken "before the roll stand in the machine direction".
BRS-CD in the above table indicates readings taken "before the roll stand in the cross direction".
ARS-MD in the above table indicates readings taken "after the roll stand in the machine direction".
ARS-CD in the above table indicates readings taken "after the roll stand in the cross direction".
NR in the above table indicates "no reading" indicating no significant change from the previous reading or an indication that the melt temperature had virtually been reached.

It has been found that when the stretch ratio is lower than 1.2:1, the film has a tendency to fold and fuse upon itself just after entry into a shrink tunnel which results in a package showing unacceptable appearance by virtue of these folded and fused wrinkles.

Other resins, including copolymer resins, have been tested and found to be satisfactory. Two such copolymers include DuPont resin Number 3260 supplied by E. I. DuPont de Nemours. This is a low density polyethylene copolymer containing from 2–3% by weight, of ethylene vinyl acetate. The density of this resin is 0.920 and its melt index (melt flow) is 2.0. Another satisfactory copolymer resin that has been tested in resin 3812F supplied by Sinclair-Koppers Company. This is a low density polyethylene copolymer containing 3%, by weight, of ethylene vinyl acetate. The density of this resin is 0.926 and its melt index (melt flow) is 1.5. However, it was noted that each of these copolymers had a relatively narrow seal range of from about 5°F. to about 15°F.

It has been found in general that the haze of the films produced in accordance with the present invention tends to diminish with increasing stretch ratios. However, no significant improvement is effected in the range of 1.2:1 to 1.3:1.

The preferential film of the present invention is heat shrinkable, heat sealable, economical and suitable for shrink packaging applications. The film is durable, has a shrinkage in the longitudinal direction of the film and shrink tension sufficiently high to ensure conformity of the film upon shrinkage to irregularly shaped objects. The advantages of the film are the controllable shrink and shrink tension, good optical clarity, heat sealable, economical and machinable on automatic and semiautomatic packaging equipment.

While presently preferred embodiments of the invention have been illustrated and described, it will be recognized that the invention may be otherwise variously embodied and practiced within the scope of the claims which follow.

What is claimed is:

1. A method of making a preferentially oriented heat shrinkable film of polyethylene or polyethylene containing copolymers thereof having a shrink characteristic generally controlled by the heat applied to effect shrinking compring the steps of
   a. inflating said film in tubular form after said film is extruded from an extrusion die,
   b. collapsing said film without fusion thereof,
   c. passing said collapsed film over a stretch roll while maintaining said stretch roll at a temperature from about 170°F. to about 225°F.,
   d. stretching said film along its longitudinal axis by a factor between about 1.2:1 and 1.3:1 by effecting a speed differential of said factor between said stretch roll and an anneal roll,
   e. maintaining the temperature of said anneal roll from about 150°F. to about 220°F. to anneal said film,
   f. effecting shrinking back of said film between said anneal roll and a shrink back roll by driving said shrink back roll at a speed from about 5% to about 25% slower than said anneal roll,
   g. maintaining the temperature of said shrink back roll from about 120°F. to about 190°F.,
   h. cooling said film to about room temperature,
   i. and winding up said film on a windup roll.

* * * * *